July 3, 1934.   H. DUJARDIN   1,964,873
GUIDE
Filed Sept. 27, 1932
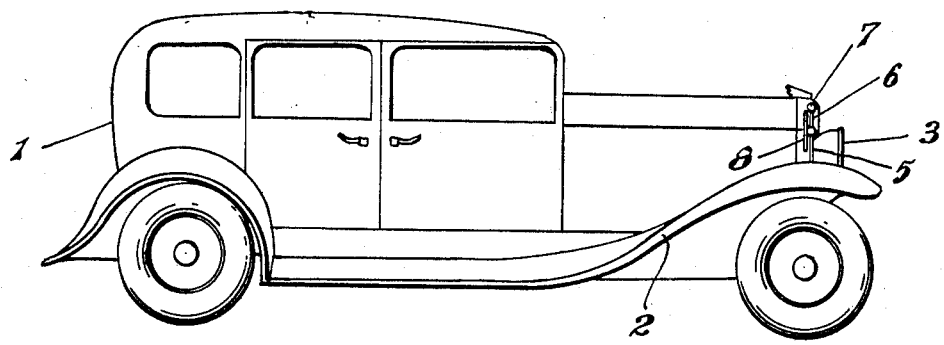
Fig. 1.
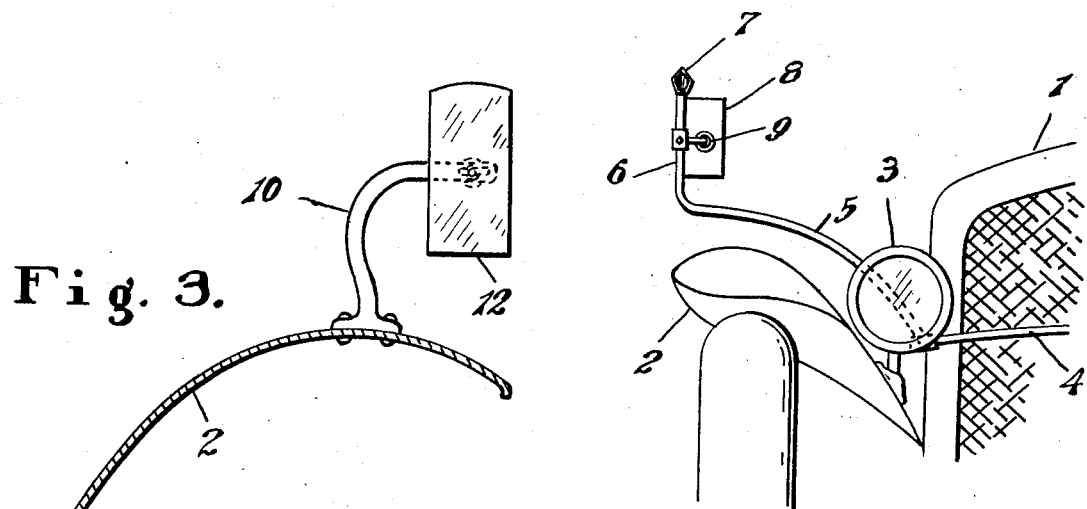
Fig. 3.
Fig. 2.
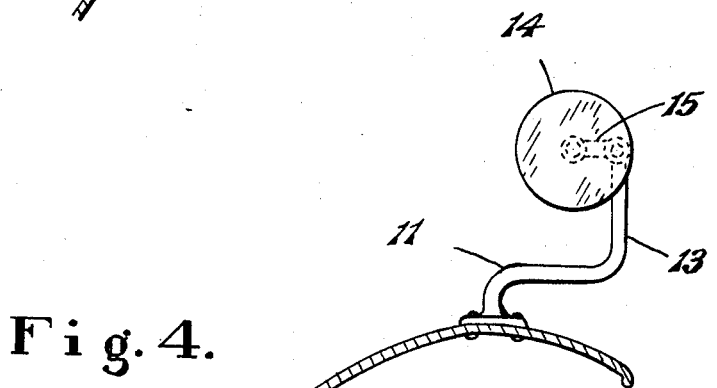
Fig. 4.
INVENTOR
Henri Dujardin.
BY HIS ATTORNEY
Howard P King Patented July 3, 1934

1,964,873

UNITED STATES PATENT OFFICE 1,964,873

GUIDE

Henri Dujardin, Rye, N. Y.

Application September 27, 1932, Serial No. 635,121

7 Claims. (Cl. 116—31)

This invention relates to guides, and more particularly to guides for motor cars.

The objects of the invention are to provide an improved guide for a motor vehicle which will enable the operator to better steer the vehicle particularly as regards vehicles or other objects on the off-side with respect to the operator; to provide a guide which will definitely and clearly indicate the outer edge of the vehicle upon which it is attached; to give the operator a forward and rearward view of the object of interest on the off-side of the vehicle; to provide for adjustment to accommodate the guide to fenders of varying width; to secure simplicity of construction and operation; and to obtain other advantages and results as may be brought out in the following description.

Referring to the accompanying drawing in which like numerals of reference indicate similar parts throughout the several views;

Figure 1 is a side elevation of a motor vehicle of the passenger type, to which my invention is applied;

Figure 2 is a front elevation of a portion of the vehicle with my invention shown in elevation thereon;

Figure 3 is an elevation of a modified construction of guide attached to a fender shown in cross section, and Figure 4 is a further modified construction of guide attached to a fender and showing an adjustable circular mirror as part thereof.

In the specific embodiment of the invention illustrated in said drawing, the reference numeral 1 indicates a motor vehicle having usual fender 2, headlight 3 and cross-brace 4 for the headlights and fenders. In this country it is usual for the operator of the vehicle to sit in and steer the vehicle from the left, which, in most instances, renders the right fender out of the operator's range of vision. The operator is therefore handicapped in handling the vehicle by failure to know exactly the position of the right or off side of the vehicle. The present invention overcomes this short-coming with entire satisfaction.

I am aware that guides have heretofore been proposed one of which is attached to the edge of the fender and stands upright therefrom. While such a guide has been found helpful to a certain extent, it fails to accomplish the result of the present invention. With a guide such as known in the prior art, the operator has to concentrate upon the device because it is so slender and vibrates. Furthermore, because of the required concentration, there is a tendency for the operator to swing the vehicle toward the right, especially the moment the other vehicle or object is passed, for then there is nothing in the direction in which the operator is looking to use as a directional line. According to the present invention, I counteract this visual tendency and enable the driver to guide the vehicle in a straight course without cutting-in too quickly after passing another vehicle.

As shown in Figures 1 and 2, there is provided a sturdy bracket 5 attached at its lower end for convenience, to the cross-brace 4, thus enabling the bracket to be placed in proper relation to the outer edge of the fender 2. Any suitable mode of attachment of the bracket may be employed, such as welding, brazing, use of clamping bolts or set screws and various other ways and means known in the mechanical arts. The bracket extends upwardly and outward above the vehicle fender to the plane of the outer edge thereof where the bracket turns upwardly to form a vertical guide thereat for the operator to see while driving. The upper end of this vertical or guide portion 6 may be ornamented in any desired manner, for instance by an enclosure 7 for an electric light.

Carried by said bracket is a mirror 8, preferably attached, as by a ball and socket 9, so as to be adjustable for the proper positioning thereof to the vision of the operator. This mirror preferably is vertically elongated with a straight outer edge and with the outer edge substantially aligned to coincide, as viewed by the operator, with the vertical or guide portion 6 of the bracket. The edge of the mirror accordingly becomes a guide indicating the edge of the vehicle. As the operator drives, and passes another vehicle, he watches the edge of the mirror to give himself proper distance, and his vision is therefore affected by the movement of objects seen directly and reversely affected by the opposite movement of objects as observed in the mirror. Consequently there will not be any tendency to swing to the right or cut-in when direct vision of the object passes. Furthermore, without any shift in the line of vision, the operator continues to observe the vehicle or object just passed, and is thereby enabled to drive properly with respect thereto.

In the modifications of Figures 3 and 4, the brackets 10 and 11 respectively are shown attached to a middle part of the fender which has a rigidity greater than the side flange and therefore affords a support for a guide not seriously affected by vibration. In Figure 3, I have shown an adjustable mirror 12 having a vertical outer edge substantially above the outer edge of fender 2. In this instance, therefore, the mirror and its edge constitute the guiding means for the operator to observe. On the other hand, in Figure 4, the bracket is arranged with a vertical portion 13 substantially above the outer edge of the fender. A mirror 14 is carried by this bracket by an interposed adjustable arm 15 which enables the mirror to be swung if required to a position further from the operator than the vertical portion of the bracket. The vertical portion of the bracket affords the guiding means to indicate the edge of the vehicle, and the mirror supplements that guiding means as described above in respect of the mirror of the preferred construction.

Obviously other detail changes and modifications may be made in the construction and use of my improved guide, without departing from the spirit or scope of the invention, and I do not wish to be understood as limiting myself to the exact constructions shown or described except as set forth in the following claims when construed in the light of the prior art.

Having thus described the invention, I claim:—

1. A guide for motor vehicles, comprising in combination with a straight edge positioned substantially vertically above the outer edge of the motor vehicle fender, a mirror adjacent said straight edge so as to be within the line of vision of the operator when observing said straight edge.

2. A guide for motor vehicles, comprising a bracket attached to the vehicle inwardly from the outer edge thereof and extending substantially to a position at the outer edge of the vehicle, and a mirror on said bracket at the outer edge of the vehicle.

3. A guide for motor vehicles, comprising a bracket attached to the vehicle and extending to a position substantially at the outer edge of the vehicle in the line of vision of the operator, and a mirror on said bracket at the outer edge of the vehicle, one of said parts having a vertical edge for indicating to the operator the position of the outer edge of the vehicle.

4. In combination with a motor vehicle wherein the operator sits next to one side thereof for driving purposes, said vehicle having a front fender at the opposite side from the operator's position, a mirror having a vertical edge substantially at the edge of the fender of the vehicle furthest distant from the position of the operator and at the outer edge of the vehicle, and means for mounting said mirror in the line of vision of the operator while driving with said edge of the mirror functioning as a guide and the mirror being in the line of vision of the operator simultaneously with the guiding edge for counteracting tendency to swing the vehicle resulting from watching said edge.

5. A guide for motor vehicles, comprising a mirror having an outer edge thereof substantially at the outer edge of the vehicle, a headlight cross-brace on said vehicle, and a bracket from said cross-brace to said mirror.

6. A guide for motor vehicles, comprising a bracket secured to the fender of said vehicle, said bracket having a vertical portion positioned substantially above the edge of the fender, and a mirror carried from said bracket and in the line of vision of the operator while observing and being guided by said vertical portion of the bracket.

7. A guide for motor vehicles, comprising a bracket secured to the fender of said vehicle, said bracket having a vertical portion positioned substantially above the edge of the fender, and a mirror eccentrically carried from said bracket for obtaining adjustment of the mirror with respect to the outer edge of the vehicle, said mirror being in the line of vision of the operator while observing and being guided by said vertical portion of the bracket.

HENRI DUJARDIN.